United States Patent
Wengenroth

[11] Patent Number: 6,145,361
[45] Date of Patent: Nov. 14, 2000

[54] APPARATUS AND METHOD FOR PRODUCTION OF BALLS BY A ROLLING OPERATION

[76] Inventor: Volker Wengenroth, Gärtnerstrasse 40, D-42369 Wuppertal, Germany

[21] Appl. No.: 09/195,838

[22] Filed: Nov. 19, 1998

[51] Int. Cl.[7] .................................................. B21K 01/02
[52] U.S. Cl. ................................................ 72/72; 72/92
[58] Field of Search ................................. 72/70, 72, 90, 72/92, 93, 424; 83/149, 150

[56] References Cited

U.S. PATENT DOCUMENTS

| | | | |
|---|---|---|---|
| 939,061 | 11/1909 | Mowry | 72/92 |
| 1,951,234 | 3/1934 | Brenholtz | 72/92 |
| 3,851,513 | 12/1974 | Pazdirek | 72/90 |

FOREIGN PATENT DOCUMENTS

| | | |
|---|---|---|
| 202032 | 9/1908 | Germany . |
| 336151 | 4/1921 | Germany . |

*Primary Examiner*—Lowell A. Larson
*Attorney, Agent, or Firm*—Martin A. Farber

[57] ABSTRACT

A process and apparatus for producing metal balls from a cylindrical strand material, with two rolling jaws which are displaceable relative to one another and of which each forms a shaping groove which extends in a direction of displacement, wherein the jaws are located displaceably relative to one another such that U-grooves, which are located opposite one another on the opening side, form a shaping channel, a blank being rolled, as a result of displacement of the channel walls relative to one another, on its passage through said shaping channel. The blank is fed by a feed device, via a feed channel, to an opening of the shaping channel and is cut off from the strand, by a cutting tool, beforehand, wherein the wire (1) is inserted through a shearing opening (2), which opens transversely into the feed channel (7), until it reaches a stop (3), which is located opposite the shearing opening (2), and is cut off by a shearing cutter (5), which is associated with the shearing opening (2), in the direction in which the feed channel (7) progresses. The stroke of the shearing cutter (5) advances a plurality of wire sections (6), which are located parallel to one another in the direction of a mouth opening of the shaping channel, wherein once the shearing stroke has ended, the foremost wire section (6) is fed to a shaping operation.

12 Claims, 3 Drawing Sheets

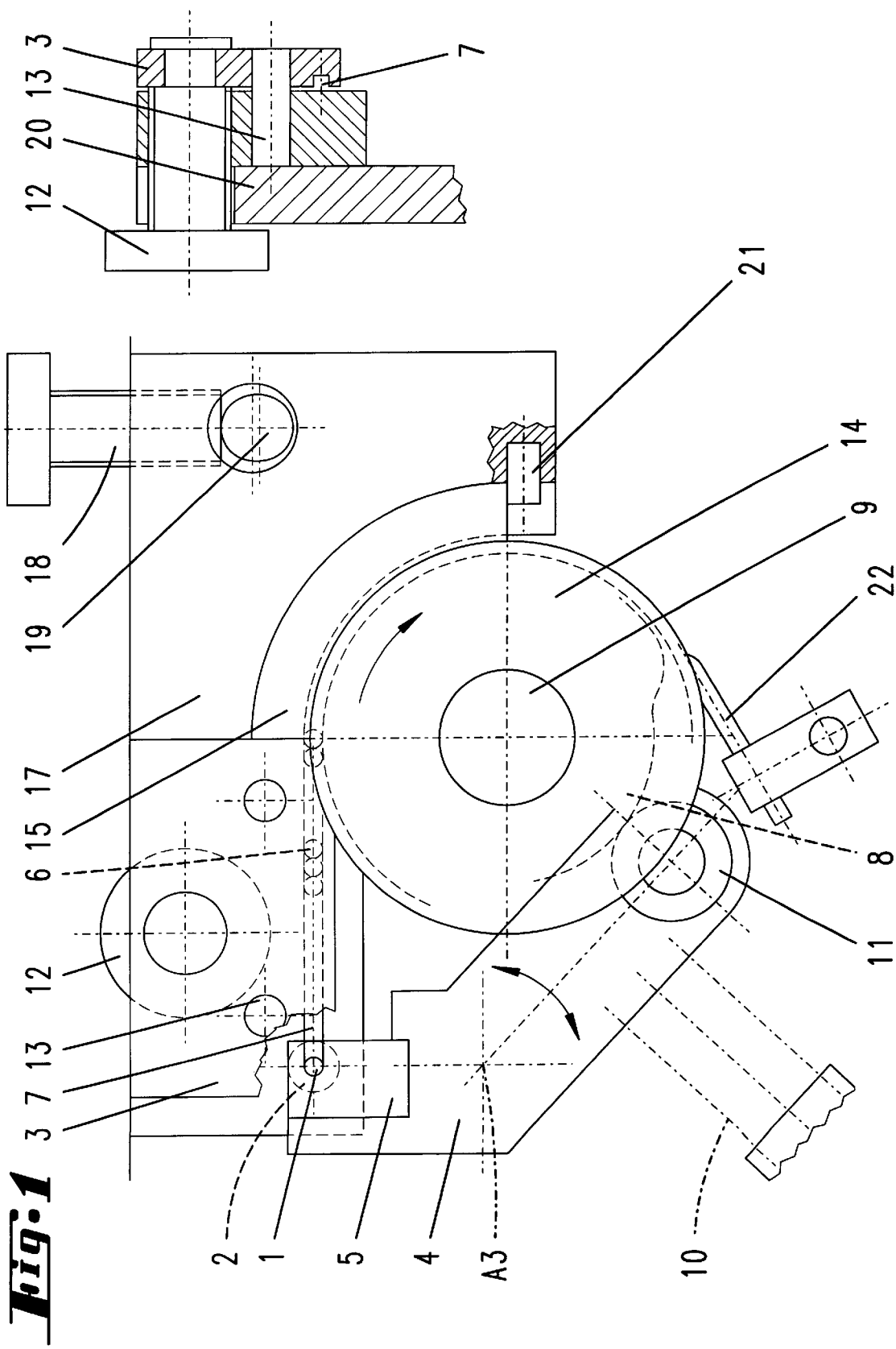

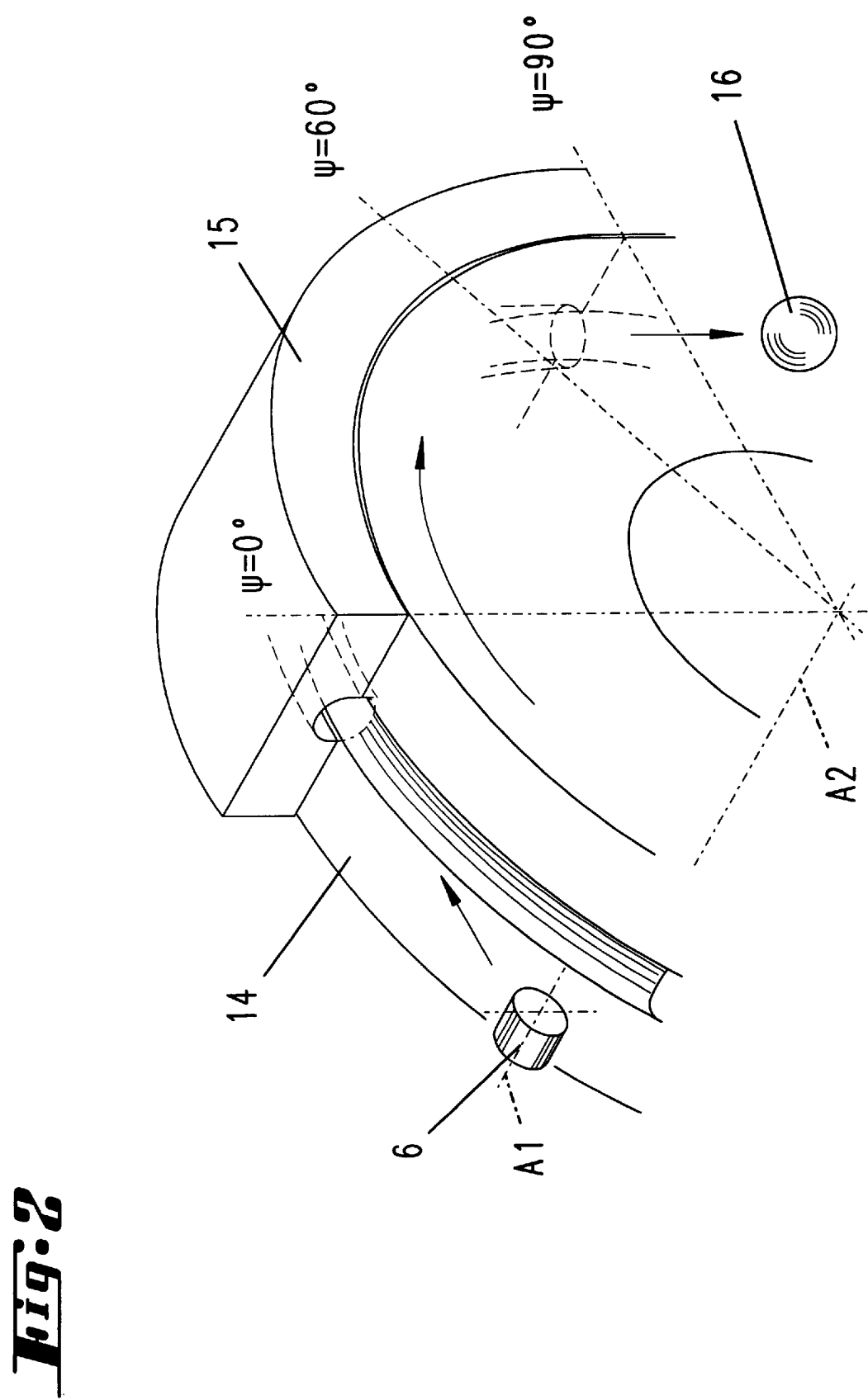

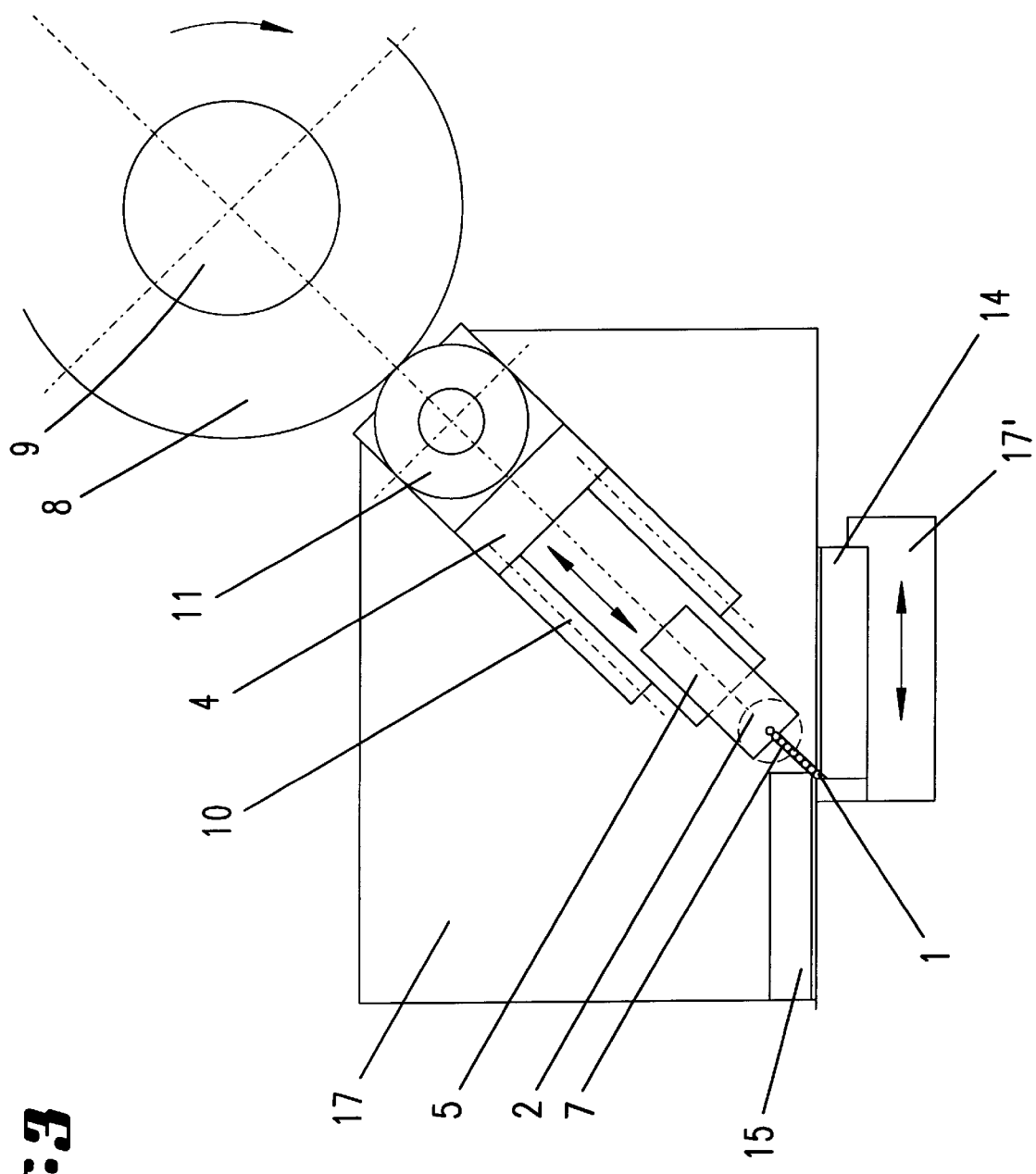

APPARATUS AND METHOD FOR PRODUCTION OF BALLS BY A ROLLING OPERATION

FIELD AND BACKGROUND OF THE INVENTION

The invention relates to a process for producing balls of the generic by a rolling operation and to an associated apparatus.

DE 336 151 discloses a ball rolling mill with two rolling jaws which can be displaced relative to one another. In this document, the rolling jaws are formed, on the one hand, by a rolling roll and, on the other hand, by a stationary segment which engages around part of the rolling roll. The shaping grooves are provided on the circumferential surface of the rolling roll and on the hollow surface of the segment. The two jaws are located displaceably with respect to one another such that the U-shaped shaping grooves are located opposite one another on the opening side. A shaping channel is formed as a result, a blank being rolled, as a result of the displacement of the channel walls relative to one another, on its passage through said shaping channel. The known apparatus also has a feed device for the purpose of feeding blanks, which are cut off from a wire strand by means of a cutting tool, via a feed channel, to an opening of the shaping channel. In the known apparatus, the cylindrical blanks, which are located one behind the other in a guide channel, are separated by a spoked wheel and fed into the opening of the shaping channel as a result of gravitational force. The operation of rolling the cylindrical blank into the form of a ball takes place by way of a shaping channel which tapers vertically in the rolling direction.

DE 202 032 likewise discloses a process for producing balls from a cylindrical metal rod, without any waste, as well as an associated apparatus. In this document, a cutter is used to cut off a blank, which is provided with a V-shaped groove, from a wire strand and then to feed it, by means of a feed device (not described in any more detail) into a shaping channel. In this document, the shaping channel is formed by the interspace between two rolls which are driven in the same direction of rotation.

SUMMARY OF THE INVENTION

It is an object of the invention is to improve the feeding of the blanks.

This object is achieved by the process according to the invention and the apparatus according to the invention which provide improved and disruption-free feeding of the cylindrical blanks. The end of the wire strand projects through the shearing opening, which opens out transversely into the feed channel, until it reaches a stop, which is located opposite the shearing opening. The strand end is inserted through this shearing opening. The shearing opening is associated with a shearing cutter, which can be displaced in the direction in which the feed channel progresses. Said shearing cutter is guided past the shearing opening and, in the process, severs a cylindrical section from the strand end. This cylindrical section is then introduced into the feed channel by the shearing cutter. In this case, the shearing cutter is driven in time with the roll displacement. A multiplicity of cylindrical blanks are then located parallel to one another, and one behind the other, in the feed channel and are advanced by the movement of the shearing cutter. With each shearing stroke, this displacement feeds a blank into the mouth opening of the shaping channel. The process according to the invention has the advantage that a satisfactory geometrical ball can be produced very quickly with relatively low mechanical outlay. This is the case, in particular, when the rolling jaws take the form of those according to DE 336 151, the rolling roll is driven continuously and the shearing cutter is driven as a result of a control cam of the main drive shaft of the rolling roll. The process is used to process, as a semifinished product, a round wire, which is supplied as a coil. The wire is drawn by a drawing-in mechanism, by way of a shearing bushing, into the ball rolling mill until it reaches the stop plate. The shearing cutter cuts off a cylindrical wire section, the length of which can be determined by the position of the stop plate. Each shearing stroke pushes a wire section at the end of the feed channel into the roll nip, and the shaping operation thus begins. The maximum shearing speed corresponds to the circumferential speed of the rolling roll. Following the return stroke of the shearing lever by way of the drive crank, the drawing-in mechanism advances the wire again until it reaches the stop plate. The U-shaped grooves of the shaping channel are designed such that the geometry changes continuously from a rectangular cross section to a circular cross section, in order thus to shape the cylindrical wire section into the form of a ball. After approximately 60°, the geometry of the tool is circular and the shaping operation is terminated. The remaining 30° section of the shaping path, which covers 90° altogether, serves for smoothing the ball surface. The horizontal position of the segment-retaining means can be altered via an adjusting screw. Also provided is a stripper, which, once the rolling operation has been completed, can push the ball out of the profile of the rolling roll. The profile of the shaping grooves is preferably selected such that the blank is subjected to loading to the greatest possible extent over its entire surface area during the shaping operation. Linear abutment or abutment at certain points should be avoided as far as possible. The feed channel opens out preferably tangentially or at an acute angle with respect to the inlet section of the shaping grooves. It is also possible, however, for the shaping grooves to have a cross section which remains constant over the entire groove length. Furthermore, it may be provided that the rolling jaws are flat rolling jaws with shaping grooves provided therein. This then means that it is not possible for either of the two rolling jaws to move continuously. Rather, this variant of the invention provides that one of the two rolling jaws can be displaced back and forth with respect to another, fixed rolling jaw. It is possible for the rolling jaws to be arranged horizontally one above the other. Furthermore, it may be provided that, during the displacement of the rolling jaws relative to one another, there is a reduction in the mutual spacing between the groove bases in the region where the workpiece is positioned. The movable rolling jaw is preferably a rolling roll with a circumferential groove arranged on the circumference side. Said grooves may have a constant cross section. The stationary rolling jaw may then be formed by a segment of a circle, which preferably extends over 90°. It is possible to set the width of the channel in the region of the stop, so that it is possible to optimize the length of the cylindrical blank. The shearing cutter is preferably positioned on one arm of a two-armed lever. The other arm of the lever is in contact with a control cam of the rolling roll.

BRIEF DESCRIPTION OF THE DRAWINGS

With the above and other objects and other advantages in view, the present invention will become more clearly understood in connection with the detailed description of preferred embodiments, when considered with the accompanying drawings of which:

FIG. 1 shows a schematic illustration of the view of a ball rolling mill according to the invention, FIG. 2 shows a schematic illustration, in perspective, of the rolling jaws together with the mouth opening of the shaping channel, and FIG. 3 shows a second exemplary embodiment of the invention with rolling jaws which can be moved back and forth.

DETAILED DESCRIPTION OF THE PREFERRED EMBODIMENTS

The wire 1 is drawn off from a coil and fed to the ball rolling mill by means of a drawing-in device (not illustrated). In this case, the wire 1 passes, by way of a shearing bushing 2, into a feed channel 7. In the exemplary embodiment, the feed channel 7 runs horizontally. It is also conceivable, however, for the feed channel to run at an angle to the horizontal. A stop plate 3 is located opposite the shearing bushing 2. The stop plate 3 can be displaced by means of an adjusting screw 12, with the result that it is possible to set the width of the feed channel in the region of the shearing bushing 2, which in turn sets the axial length of the blank 6, which is cut off by means of a shearing cutter 5 and pushed into the feed channel 7. An adjusting screw 12 is used for setting the spacing between the stop plate 3 and the wall 20 of the machine body. Also provided are two retaining pins 13, which serve as an articulation point or as a bearing for the stop plate 3.

The shearing cutter 5 is associated with to one end of a two-armed shearing lever 4, which can be pivoted about an axis of rotation A3. The other arm of the shearing lever 4 bears a contact roller 11, which is in contact with a control cam 8 of the main shaft. A rolling roll 14 is positioned on the main shaft 9, which is driven by an electric motor (not illustrated). The rolling roll 14 has, on its shaping surface, a U-shaped circumferential groove, which forms a shaping groove.

Over a 90° section, the rolling roll 14 is enclosed by a stationary segment 15, which forms a shaping groove in its hollow side. The two shaping grooves are located opposite one another on the opening side and form a shaping channel. The width of the shaping channel can be set by means of an adjusting screw 18 and a bolt 19.

Additionally provided is a stripper 22, which engages in the shaping groove of the rolling roll 14 in order to strip off the balls. The cross section of the U-shaped shaping groove of the rolling roll 14 is preferably the same throughout. However, provision is also made for the U cross section to merge continuously from a rectangular cross section to a semicircular cross section. The shaping groove of the stationary segment 15 may also be formed correspondingly. In the case of such a groove configuration, the blanks 6 are fed at the point where the rectangular groove section of the rolling roll 14 is located opposite the rectangular groove section of the stationary segment 15. This is the case if the two rectangular groove sections are located in the mouth-opening region of the shaping channel.

According to the invention, the blanks, which are sheared off by the shearing cutter 5, are fed through the feed channel 7 in that a plurality of wire sections 6 are located parallel to one another in the feed channel. In this case, the lateral surfaces of the wire sections 6 are in mutual contact, and as a result of the stroke movement of the shearing cutter 5, such wire sections are advanced in a stepwise manner in their rolling direction, with the result that it is always the foremost wire section 6, pushed by the rest of the wire sections, which is pushed into the mouth opening of the shaping channel. In the exemplary embodiment, the feed channel 7 runs horizontally and opens out virtually in alignment with the rolling direction in the region of the inlet mouth opening of the shaping channel. If—unlike the exemplary embodiment— the rolling jaws are designed as planar plates, then provision may be made for the feed channel 7 to open out at an acute angle with respect to the rolling direction. In the case of this arrangement of the rolling jaws too, the wire sections 6 should be introduced into the shaping channel by being pushed by the preceding wire sections, the stepwise advancement of the wire sections 6 in the feed channel 7 being caused by the stroke movement of the shearing cutter 5, this movement being picked up from the main drive shaft 9. The contact roller 11 may be pushed onto the drive cam 8 by means of a spring, with the result that the spring 10 acts as a return spring for the shearing cutter 5.

The width of the feed channel 7 is preferably such that, rather than being able to roll automatically therein, the wire sections 6 can only be advanced by a pushing movement and are not able to pass one over the other either.

The apparatus and the process are suitable, in particular, for producing balls with a diameter of less than 2 mm. The possibility of adjusting the width of the feed channel 7 in the region of the stop plate 3 makes it possible to set the length of the wire section 6, and this is done by rotating the adjusting screw 12. Two rods 13 assume the task of guiding the stop plate 3. The shearing lever 4, the drive cam 8 of which is positioned on the main shaft 9, is subjected to loading by the spring 10 such that the roller 11 of the shearing lever 4 follows the time/travel law of the drive cam 8 in a play-free manner. The wire sections 6 reach the rolling tool, by passing through the feed channel 7, in such a position that said wire sections 6 are pushed into the roll nip of the shaping tools via their cylindrical outer form. Each shearing stroke thus pushes a wire section 6 at the end of the feed channel 7 into the roll nip and initiates the shaping operation. The maximum shearing speed, in this case, corresponds to the circumferential speed of the rolling roll 14. After the return stroke of the shearing lever 4 by way of the drive cam 8, the drawing-in mechanism advances the wire 1 again until it reaches the stop plate 3.

FIG. 2 shows a continuously rotating rolling roll 14 and a stationary segment 15, which allow the shaping operation by virtue of their tool geometry. By virtue of rolling between the segment 15 and the rolling roll 14, the wire section 6 runs through a special tool contour if the geometry changes continuously from a rectangular cross section to a circular cross section. As a result, the essentially cylindrical wire section 6 is shaped into the form of a ball 16 by being subjected to loading over its entire surface area, and/or linearly in cross section. The axis of rotation Al of the wire section 6 is maintained throughout the entire shaping operation. After approximately 60°, the geometry of the tool is circular and the shaping operation is terminated. The remaining 30° section serves for smoothing the ball surface.

As illustrated in FIG. 1, the horizontal position of the segment 15 can be altered by the possibility of adjusting the segment-retaining means 17 horizontally via an adjusting screw 18. In this case, the adjusting screw 18 is supported on a bolt 19, which is fastened on the wall 20 of the machine body. A stop pin 21 positions the segment 15 on the segment-retaining means 17.

FIG. 3 illustrates a second exemplary embodiment of the invention. The rolling jaws 14, 15 in this case are plates which can be displaced back and forth and have a shaping groove (not illustrated). The feed channel 7 is inclined with respect to the direction of displacement of the plates. The cut-off wire sections are located parallel to one another, and one behind the other, in the feed channel 7. The shearing cutter 5 is displaced back and forth with respect to the spring 10 by means of a slide 4, on which a contact roller 11 is positioned, the movement direction of the shearing cutter being in alignment with the direction in which the feed channel 7 extends and running at an acute angle with respect to the direction of displacement of the rolling jaws 14, 15.

The contact roller 11 is in contact with a drive cam 8, which is driven by a main drive shaft 9. The rotational speed of the shaft 9 coincides with the number of strokes of the movable rolling jaw 14. The movable rolling jaw 14 is positioned on a rolling-jaw carrier 17', which is moved back and forth by a drive device (not illustrated).

What is claimed is:

1. An apparatus for producing, in particular, small metal balls from cylindrical strand material, with two rolling jaws which are displaceable relative to one another and of which each forms a shaping groove which extends in the direction of displacement, wherein the jaws are located displaceably with respect to one another such that U-grooves, which are located opposite one another on an opening side, form a shaping channel, a blank being rolled, as a result of displacement of the channel walls relative to one another, on its passage through said shaping channel, and with a feed device for feeding the blanks, which are cut off from the strand by a cutting tool, via a feed channel, to an opening of the shaping channel, the apparatus comprising:

a shearing opening (2), which opens out transversely into a location of the feed channel (7) at a distance from the opening of the shaping channel, wherein and through which a strand end is insertable across the feed channel until the strand end projects against a stop (3), said stop being located opposite the shearing opening (2), and a shearing cutter (5) which is associated with the shearing opening (2), said shearing cutter being displaceable in direction of the feed channel (7) and, upon shearing off the blanks (6), advances the blanks (6) into a length of the feed channel between said location and said opening of the shaping channel, which blanks are located parallel to one another and arranged in a row in the length of the feed channel, in direction of the opening of the shaping channel, the length of the feed channel being greater than the diameters of a plurality of the blanks for holding the row of blanks.

2. The apparatus according to claim 1, wherein the stop is formed by the channel wall which is located opposite the shearing opening (2).

3. The apparatus according to claim 1, wherein the feed channel (7) runs tangentially or at an acute angle with respect to an inlet section of the shaping grooves.

4. The apparatus according to claim 1, wherein the shape of the groove cross section is constant over the entire groove length.

5. The apparatus according to claim 1, wherein, during the displacement of the rolling jaws (14, 15) relative to one another, there is a reduction in mutual spacing between groove bases.

6. The apparatus according to claim 1, wherein a movable one of said rolling jaws is formed by a rolling roll (14).

7. The apparatus according to claim 1, wherein a stationary one of said rolling jaws is formed by a segment (15) of a circle.

8. The apparatus according to claim 1, wherein the width of the feed channel (7) in the region of the stop (3) is settable.

9. The apparatus according to claim 1, wherein the shearing cutter (5) is positioned on one arm of a two-armed lever (4), and another arm of said lever is in contact with a control cam (8) of a drive shaft (9) of a rolling roll (14).

10. The apparatus according to claim 1, wherein a profile of the shaping groove merges continuously from a rectangular profile into a semicircular profile.

11. The apparatus according to claim 1, wherein the two rolling jaws move in a linear manner relative to one another.

12. The apparatus according to claim 1, wherein said laws comprise a top rolling jaw (15) and a bottom rolling jaw (14), wherein the bottom rolling jaw (14) is moved back and forth with respect to top rolling jaw (15), and the feed channel (7) runs obliquely with respect to movement direction of the bottom rolling jaw (14) and in alignment with respect to the shearing movement of the shearing cutter (5).

* * * * *